US010143965B1

(12) United States Patent
Gunugunuri et al.

(10) Patent No.: US 10,143,965 B1
(45) Date of Patent: Dec. 4, 2018

(54) PALLADIUM OXIDE DISPERSED ON SPINEL OXIDES AS CATALYSTS FOR DIRECT NOX DECOMPOSITION

(71) Applicant: Toyota Motor Engineering & Manufacturing North America, Inc., Erlanger, KY (US)

(72) Inventors: Krishna Gunugunuri, Canton, MI (US); Charles Alexander Roberts, Farmington Hills, MI (US); Torin C. Peck, Ypsilanti, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 15/590,588

(22) Filed: May 9, 2017

(51) Int. Cl.
| | |
|---|---|
| *B01D 53/94* | (2006.01) |
| *F01N 3/20* | (2006.01) |
| *B01J 23/89* | (2006.01) |
| *B01J 23/00* | (2006.01) |

(52) U.S. Cl.
CPC ........ *B01D 53/9413* (2013.01); *B01J 23/005* (2013.01); *B01J 23/8913* (2013.01); *F01N 3/2066* (2013.01); *B01D 2255/1023* (2013.01); *B01D 2255/405* (2013.01); *F01N 2370/02* (2013.01)

(58) Field of Classification Search
None
See application file for complete search history.

(56) References Cited

U.S. PATENT DOCUMENTS

| | | | | | |
|---|---|---|---|---|---|
| 3,767,764 | A | * | 10/1973 | Dolbear | B01D 53/9413 423/213.2 |
| 4,274,981 | A | * | 6/1981 | Suzuki | B01D 53/945 423/213.5 |
| 7,384,889 | B2 | * | 6/2008 | Ito | B01D 53/945 502/304 |

FOREIGN PATENT DOCUMENTS

IN 258916 2/2014

OTHER PUBLICATIONS

Soloviev, et al. "Effect of CeO2 and Al2O3 on the activity of Pd/Co3O4/cordierite catalyst in the three way catalysis reactions" J. Environ Sci. 1327-1333. 24(7) 2012.*
Kouotou et al. "controlled synthesis of Co3O4 spinel with Co(acac)3 as precursor". 10809-10812 (2012).*
(Continued)

*Primary Examiner* — Sheng H Davis
(74) *Attorney, Agent, or Firm* — Christopher G. Darrow; Darrow Mustafa PC (57) ABSTRACT

Active catalysts for the treatment of a low temperature exhaust gas stream are provided containing palladium oxides dispersed on a spinel oxide for the direct, lean removal of nitrogen oxides from the exhaust gas stream. The low temperature (from about 400° C. to about 650° C.), direct decomposition is accomplished without the need of a reductant molecule. In one example, PdO may be dispersed on a surface of a metal oxide support, such as $Co_3O_4$ spinel oxide, synthesized using wet impregnation techniques. The $PdO/Co_3O_4$ catalyst system converts nitric oxide to nitrogen gas with high product specificity, avoiding the production of a significant concentration of the undesirable $N_2O$ product.

17 Claims, 8 Drawing Sheets

(56) References Cited

OTHER PUBLICATIONS

Jodlowski et al., Spectroscopic characterization of Co3O4 catalyst doped with CeO2 and PdO for methane catalytic combustion, Spectrochim. Acta A: Molec. and Biomolec. Spectrosc., 131, pp. 696-701 (2014).

Park, P.W. et al., "NO decomposition over sodium-promoted cobalt oxide," Catalysis Today, 42, pp. 51-60 (1998).

Dallago, R.M., et al., Pd-W and Pd-Mo Catalysts for NO Decomposition and NO/CO Reduction Reactions, J. Braz. Chem. Soc., vol. 20, No. 5, pp. 873-879 (2009).

Castegnaro, M.V., et al., "On the Reactivity of Carbon Supported Pd Nanoparticles during NO Reduction: Unraveling a Metal-Support Redox Interaction," Langmuir, 29, pp. 7125-7133 (2013).

de Oliveira, A.M., "NO decomposition on mordenite-supported Pd and Cu catalysts," Catalysis Communications, 8, pp. 1293-1297 (2007).

Naito, S., et al., "Marked particle size and support effect of Pd catalysts upon the direct decomposition of nitric oxide," Catalysis Today, 73, pp. 355-361 (2002).

Huang, Y.-J. et al., Enhanced Decomposition of NO on the Alkalized PdO/Al2O3 Catalyst, Chemosphere, vol. 39, No. 13, pp. 2279-2287 (1999).

Haneda, M., et al., "Alkali metal-doped cobalt oxide catalysts for NO decomposition," Applied Catalysis B: Environmental, 46, pp. 473-482 (2003).

de Oliveira, A.M., et al., "Decomposition of nitric oxide on Pd-mordenite," Catalysis Today, 133-135, pp. 560-564 (2008).

\* cited by examiner

PALLADIUM OXIDE DISPERSED ON SPINEL OXIDES AS CATALYSTS FOR DIRECT NOX DECOMPOSITION

TECHNICAL FIELD

The present disclosure generally relates to catalysts for treatment of an exhaust gas stream and, more particularly, to catalysts containing palladium oxide on a spinel for removal of nitrogen oxides from an exhaust gas stream as generated by an internal combustion engine, or the like.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Catalysts effective at removing NOx from exhaust emissions are desirable in order to protect the environment and to comport with regulations directed to that purpose. It is preferable that such catalysts convert NOx to inert nitrogen gas, instead of converting NOx to other nitrogen-containing compounds. Catalysts that are effective at low temperature may have additional utility for vehicles.

Increasingly stringent NOx emission and fuel economy requirements for vehicles and automobile engines will require catalytic NOx abatement technologies that are effective under lean-burn conditions. Direct NOx decomposition to $N_2$ and $O_2$ is an attractive alternative to NOx traps and selective catalytic reduction (SCR) for this application, as NOx traps and SCR processes are highly dependent on reductants (such as unburned hydrocarbons or CO) to mitigate NOx. The development of an effective catalyst for direct NOx decomposition would eliminate the use of reducing agents, simplifying the NOx removal process, and therefore decreasing the fuel efficiency cost of NOx abatement.

However, most catalysts active for direct NOx decomposition are only efficient at high temperatures (i.e., greater than about 600° C.), which severely limits a practical application (Ser. No. 01/060,221) 1 for a vehicle exhaust gas stream. The most well-known low temperature (i.e., less than about 500° C.) direct NOx decomposition catalysts include Cu-ZSM5, $K/Co_3O_4$, $Na/Co_3O_4$, CuO, and $Ag/Co_3O_4$. However, low temperature activity and selectivity to $N_2$ for all of these catalysts is not sufficient for practical application, and more advancements are needed. Advancements in direct NOx decomposition catalysis based on structure activity relationships are lacking, and methodology to improve the performance of specific catalyst systems is needed.

Accordingly, it would be desirable to provide a catalyst for the removal of NOx from exhaust gas, that is effective at low temperature and that has high $N_2$ product specificity.

SUMMARY

This section provides a general summary of the disclosure, and is not a comprehensive disclosure of its full scope or all of its features.

In various aspects, the present teachings provide a catalyst system for the direct decomposition removal of $NO_x$ from an exhaust gas stream. The exhaust gas stream may be provided at a temperature of from about 400° C. to about 650° C. The catalyst system may include a $Co_3O_4$ spinel oxide, and PdO dispersed on a surface of the $Co_3O_4$ spinel oxide. The catalyst system is configured to catalyze a decomposition of the NOx to generate $N_2$ without the presence of a reductant. The PdO may be provided in an amount of from about 1 wt % to about 3 wt % of the catalyst system.

In other aspects, the present teachings provide a catalytic converter for the direct decomposition removal of $NO_x$ from an exhaust gas stream. The exhaust gas stream may be flowing through the catalytic converter at a temperature of from about 400° C. to about 650° C. The catalytic converter may include an inlet configured to receive the exhaust gas stream into an enclosure, and an outlet configured to allow the exhaust gas stream to exit the enclosure. A catalyst system may be contained inside the enclosure, the catalyst system including PdO dispersed on a metal oxide, configured to catalyze a decomposition of the NOx to generate $N_2$ without the presence of a reductant.

In still further aspects, the present teachings provide methods for the direct decomposition removal of $NO_x$ from a low temperature exhaust gas stream. The methods may include flowing the exhaust gas stream through a catalyst system. This includes exposing the exhaust gas stream to palladium oxide dispersed on a surface of a metal oxide support containing spinel structure. The exposure results in catalyzing a decomposition of the NOx to generate $N_2$ without the presence of a reductant. In various aspects, PdO is provided in an amount of about 3 wt % of the catalyst system. Flowing the exhaust gas stream through the catalyst system at a temperature at or greater than about 450° C. may result in obtaining an NOx selectivity to $N_2$ greater than about 75%.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide an active catalyst for the treatment of a low temperature exhaust gas stream. The catalyst includes palladium oxides dispersed on a metal oxide support for the direct, lean removal of nitrogen oxides from the exhaust gas stream. The low temperature (i.e., from about 400° C. to about 650° C.), direct decomposition is accomplished without the need of a reductant (i.e., $H_2$, CO, $C_3H_6$ or other hydrocarbons, and/or soot), thereby improving fuel efficiency. Direct decomposition, as discussed herein, refers to catalytic transformation of nitrogen oxides to elemental nitrogen and oxygen. This differs, for example, from catalytic reduction of nitrogen oxides to ammonia and water. In one example, PdO may be dispersed or substantially uniformly spread out on a surface of a metal oxide support, such as $Co_3O_4$ spinel oxide, synthesized using a wet impregnation technique. The PdO/$Co_3O_4$ catalyst system converts nitric oxide to nitrogen gas with high product specificity, all while avoiding the production of a significant concentration of the undesirable $N_2O$ product. In various preferred aspects, the PdO/$Co_3O_4$ catalyst may be operable at exhaust gas/stream temperatures lower than about 650° C., lower than about 600° C., lower than about 550° C., lower than about 500° C., lower than about 450° C., and even lower than or at about 400° C. As discussed in more detail below, it is believed that certain of the oxidized Pd reduces to metallic Pd during direct NOx decomposition, and promotes direct NOx activity.

The presently disclosed catalyst system includes methods for dispersing palladium oxide on a metal oxide support, specifically a spinel oxide with known $N_2O$ decomposition activity (i.e., $Co_3O_4$), via wet impregnation techniques. This method particularly provides for improved total yield of product $N_2$ and product selectivity to $N_2$ (versus undesired $N_2O$ and/or $NO_2$ products) during low temperature direct NOx decomposition as compared to either the bare $Co_3O_4$ spinel oxide support only or PdO. Because of the high selectivity to $N_2$ for the present teachings, the undesirable $N_2O$ product is not produced in a significant quantity during the direct NO decomposition over $Co_3O_4$ spinel-supported palladium oxide. Additionally, it has been discovered that, on a wt % basis, the addition of about 3 wt % PdO to the surface of the $Co_3O_4$ spinel improves the selectivity to the $N_2$ product from 1% to about 50% at a temperature of about 400° C., and from about 21% to about 75% at a temperature of about 450° C.

As detailed herein, the present teachings not only include the development of the catalyst system, but also the utilization of the catalyst system with exhaust gas streams, particularly with catalytic converters for vehicles, automobiles, and the like, as well as including methods of synthesizing the PdO supported in the spinel oxide.

Various prior art catalysts, such as zeolites or Cu—Co/$Al_2O_3$ catalysts are oxidized during operation, quickly losing activity, and is, therefore, not suitable for catalytic applications requiring long lifetimes. Alternatively, the PdO/$Co_3O_4$ as disclosed in the present technology displays good activity to $N_2$ production even after hours on stream at a temperature of about 500° C. Furthermore, the activity of the spinel supported PdO can be optimized by different loadings, or the amount of PdO present in the catalyst system by weight. For example, in various preferred aspects, the PdO is present in amount of from about 0.5 wt % to about 3.5 wt % of the catalyst, or from about 1 wt % to about 3 wt %, or from about 2 wt % to about 3 wt %, or in an amount of about 3 wt %.

The catalyst systems of the present disclosure can be used in a chamber or an enclosure, such as a catalytic converter, having an inlet and an outlet. As is commonly known to those of ordinary skill in the art, such a chamber or enclosure can be configured to receive an exhaust gas stream through the inlet and to exit the exhaust gas stream through the outlet, such that the exhaust gas stream has a particular or defined flow direction.

EXAMPLES

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Synthesis and Material Characterization $Co_3O_4$ may be purchased from a commercial supplier, such as Sigma Aldrich, and calcined at 400° C. for 1 hour. In various aspects, the $Co_3O_4$ may be in a nanoparticle form, having an average diameter of from about 2 to about 100 nm.

In one example, a 1 wt % PdO/$Co_3O_4$ catalyst is synthesized by using a wet impregnation method. In a typical synthesis procedure, 5 g of $Co_3O_4$ is mixed with 50 mL of water. Next, the required quantity of palladium nitrate is dissolved separately in deionized water and combined with the $Co_3O_4$ suspension. The mixture is heated to about 80° C. with continuous stirring. The resulting powder is then dried in an oven at 120° C. for about 12 h under air. Finally, the catalyst system is calcined at 400° C. for about 1 h in the presence of air with a 1° C./min ramp. Different loadings of Pd (2 wt %, 3 wt %, and 4 wt %) on $Co_3O_4$ are also synthesized using a similar procedure by changing the amount of palladium nitrate precursor during the synthesis.

The phase composition of spinels can be measured using X-ray diffraction measurements. X-ray powder diffraction (XRD) measurements may be performed using a Rigaku SmartLab X-Ray Diffractometer. Spectra can be collected over a 2θ range of 20-80 degrees, at a rate of 0.5 deg./min, with a step size of 0.02 deg./step. Structural assignments can be made using PDXL software. The phase composition of the materials is determined using the ICDD-PDF database.

In one example, XPS measurements are performed using a PHI 5000 Versa Probe II X-ray photoelectron spectrometer using an Al Kα source. Survey scans (with 187.85 eV pass energy at a scan step of 0.8 eV) and high resolution (O 1s), (Pd 3d) and (C 1s) scans (with 23.5 eV pass energy at a scan step of 0.1 eV) are then performed. Charging of the catalyst samples is corrected by setting the binding energy of the adventitious carbon (C 1s) to 284.6 eV. The XPS analysis is performed at ambient temperature and at pressures typically on the order of $10^{-7}$ Torr. Prior to the analysis, the samples may be outgassed under vacuum for about 30 mins.

Oxygen release characteristics of the $Co_3O_4$ and PdO/$Co_3O_4$ catalysts can then be studied using $O_2$ temperature programmed desorption ($O_2$ TPD) experiments. $O_2$ TPD experiments may be performed using a NETZSCH STA-449 thermogravimetric analyzer equipped with mass spectroscopy. Before the experiment, the catalysts can be preheated to about 300° C. in the presence of 20% $O_2$/He. After the pretreatment, the temperature may be decreased back to about 100° C. Oxygen release characteristics can be studied by heating each catalyst system from about 100° C. to about 650° C. in the presence of helium. The oxygen signal (m/z=32) can be monitored using mass spectroscopy. The $O_2$ TPD profiles are presented in temperature as a function of amount of oxygen released. Physisorbed oxygen releases below about 200° C., chemisorbed oxygen releases between about 200° C. to about 450° C., and finally the bulk oxygen releases after about 450° C. for the catalysts.

The redox properties of the $Co_3O_4$ and $PdO/Co_3O_4$ catalysts can be studied using $H_2$ temperature programmed reduction ($H_2$—TPR) experiments. $H_2$—TPR experiments may be performed using a micromeritics 3-flex chemi station equipped with a thermal conductivity detector (TCD). Before the experiment, the catalysts may be pretreated to about 300° C. in the presence of 20% $O_2$/He. After the pretreatment, the temperature is decreased back to about 20° C. Redox properties of the catalysts can be studied by heating the catalyst from about 20° C. to about 600° C. in the presence of 10% $H_2$/Ar. The changes in the hydrogen concentration may be monitored using a TCD detector.

The direct NOx decomposition measurements for the present technology may be performed in a fixed bed flow reactor following a predetermined scheme. For example, a pretreatment step begins with catalysts being pretreated at a temperature of about 500° C. in the presence of 20% $O_2$/He. After the pretreatment, the bed temperature is decreased to about 400° C., and direct NOx decomposition measurements are collected. The direct NOx decomposition measurements are performed using ~1% $NO_x$ balance helium with a gas hourly space velocity of 2,100 $h^{-1}$ and in the temperature regions of about 400° C.-650° C. For example, the temperature is held at 400° C. for about 2 hours, raised to 450° C. for about two hours, continuing up to 550° C. for about two hours, and then up to about 650° C. for about two hours.

Performance Evaluation

For direct NOx decomposition to occur, NO must directly decompose to $N_2$ and $O_2$ over the catalyst surface. However, there is a possibility for unwanted $N_2O$ and $NO_2$ formation as side products. Therefore, in addition to high NO conversion, it is also very important to have higher selectivity towards $N_2+O_2$ formation rather than $N_2O$ or $NO_2$. The reaction can be represented as:

In this regard, the selectivity towards $N_2$ can be defined as:

$N_2$ selectivity (%)=2*[$N_2$]/(2*[$N_2$]+0.5[$N_2O$]+[$NO_2$])

For the performance evaluation considerations, the catalyst systems of the present technology are first calcined at 400° C. for 1 hour. After being calcined, direct NOx decomposition is performed over $Co_3O_4$ and various $PdO/Co_3O_4$ catalysts.

Figure 1:
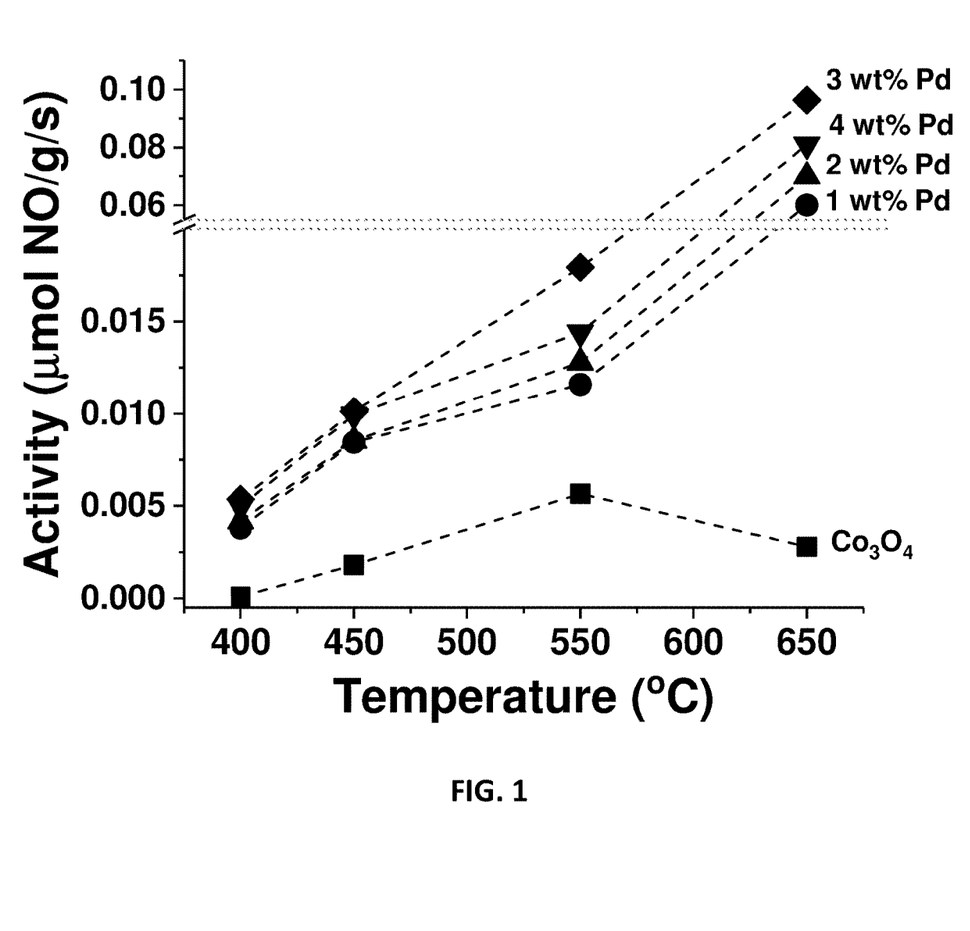
FIG. 1 illustrates NO conversion profiles (activity) over $Co_3O_4$ and $PdO/Co_3O_4$ catalysts with respect to the reaction temperature.
Figure 2:
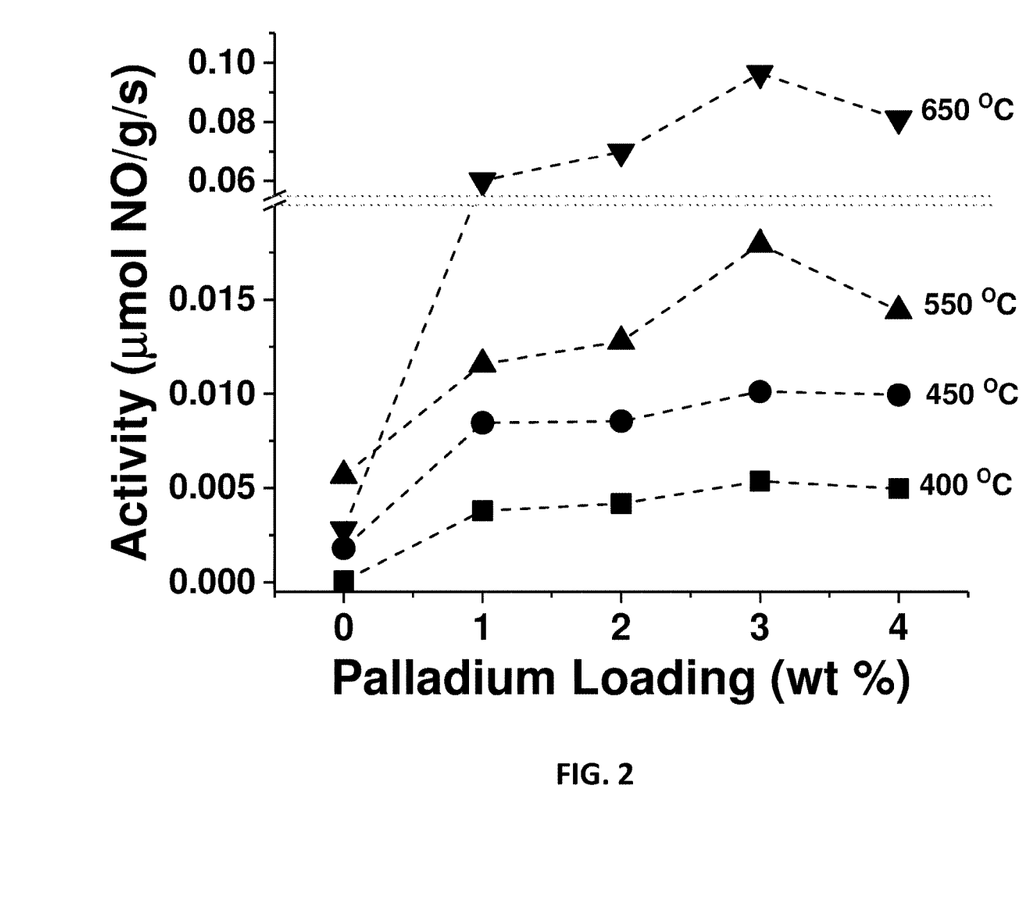
FIG. 2 illustrates NO conversion profiles (activity) over $Co_3O_4$ and $PdO/Co_3O_4$ catalysts with respect to a weight percentage of palladium loading.

The NOx activity (conversion) profiles of the $Co_3O_4$ and various $PdO/Co_3O_4$ catalysts are presented in FIG. 1 as a function of reaction temperature. As shown in FIG. 1, the NOx decomposition activity increases with increasing temperature up to about 550° C. for the $Co_3O_4$ catalyst, and notably, a further increase in the temperature to 650° C. leads to a decrease in the activity. This result suggests that the $Co_3O_4$ spinel is not a good catalyst to run for long term reactions, and for higher reaction temperatures. The addition of PdO to the $Co_3O_4$ spinel according to the present technology vastly improves the direct NOx decomposition activity. Interestingly, no deactivation is observed for any of the PdO-containing catalysts. Direct NOx activity increases with increasing reaction temperature irrespective of palladium loading. FIG. 2 illustrates NO conversion profiles over $Co_3O_4$ and $PdO/Co_3O_4$ catalysts with respect to the weight percentage of palladium loading. The activity increases with increasing palladium loading up to about 3 wt %. Further increases in the palladium loading leads to a decrease in the activity. Notably, in aspects with a 3 wt % $PdO/Co_3O_4$, the catalyst system exhibits 50 times higher activity at 650° C. as compared to the $Co_3O_4$ catalyst without Pd.

Figure 3:
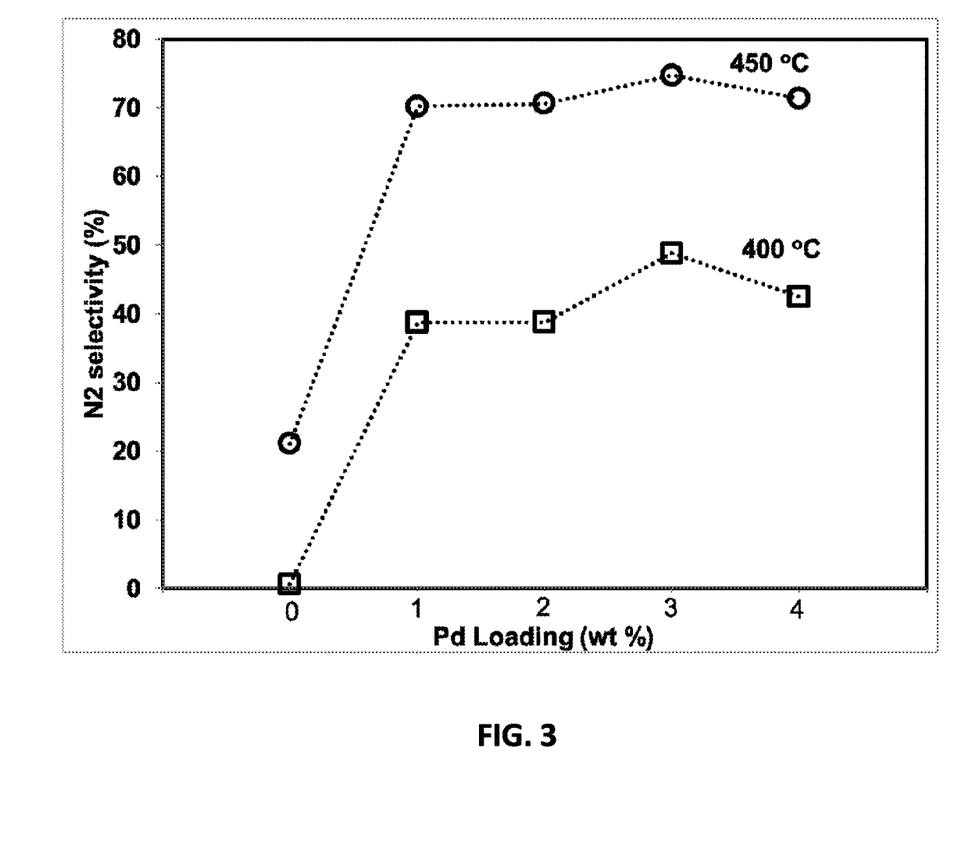
FIG. 3 illustrates $N_2$ selectivity profiles over $Co_3O_4$ and $PdO/Co_3O_4$ catalysts with respect to a reaction temperature at 400° C. and 450° C.

To confirm direct NOx decomposition to $N_2$ is taking place, rather than the unwanted side products of $N_2O$ or $NO_2$, the $N_2$ selectivity may be calculated. FIG. 3 illustrates $N_2$ selectivity profiles over $Co_3O_4$ and $PdO/Co_3O_4$ catalysts with respect to the reaction temperature at 400° C. and 450° C. Interestingly, the $N_2$ selectivity increases with increasing palladium loading on $Co_3O_4$—until reaching a maximum at 3 wt % palladium. Further increases in the palladium loading lead to a decrease in the $N_2$ selectivity. Notably, addition of about 3 wt % PdO to the $Co_3O_4$ improves the $N_2$ selectivity from about 1% to about 50% at 400° C., and from about 21% to 75% at 450° C.

Figure 4:
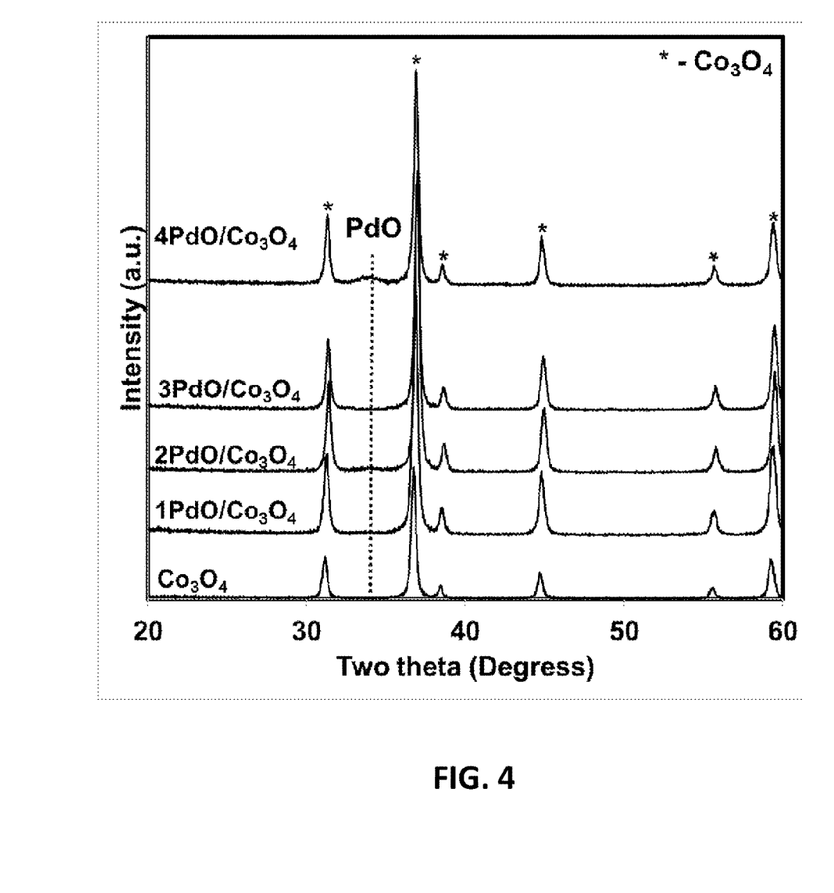
FIG. 4 illustrates x-ray diffraction profiles of the $Co_3O_4$ and $PdO/Co_3O_4$ catalysts after calcination.

The performance evaluation of the present technology also includes structural and surface characterization measurements. For example, these characterizations can be performed over $Co_3O_4$, and $PdO/Co_3O_4$ catalysts to better understand the influence of palladium deposition on the $Co_3O_4$ spinel. In this regard, FIG. 4 illustrates x-ray diffraction (XRD) profiles of the $Co_3O_4$ and $PdO/Co_3O_4$ catalysts after calcination. As shown, after calcination, $Co_3O_4$ exhibits only the expected characteristic reflections of the $Co_3O_4$ spinel structure. No reflections due to either metallic Pd or PdO are observed in the 1-3 wt % $PdO/Co_3O_4$ catalysts. However, a broad reflection in 32-36 two theta region is observed for the 4 wt % $PdO/Co_3O_4$ catalyst. This reflection is due to the PdO. The broadness of the reflection suggests that an amorphous layer of PdO is formed over $Co_3O_4$ spinel surface for the 4 wt % $PdO/Co_3O_4$ catalyst. However, for all the other $PdO/Co_3O_4$ (1-3 wt %), PdO is well dispersed over the surface of $Co_3O_4$.

Figure 5:
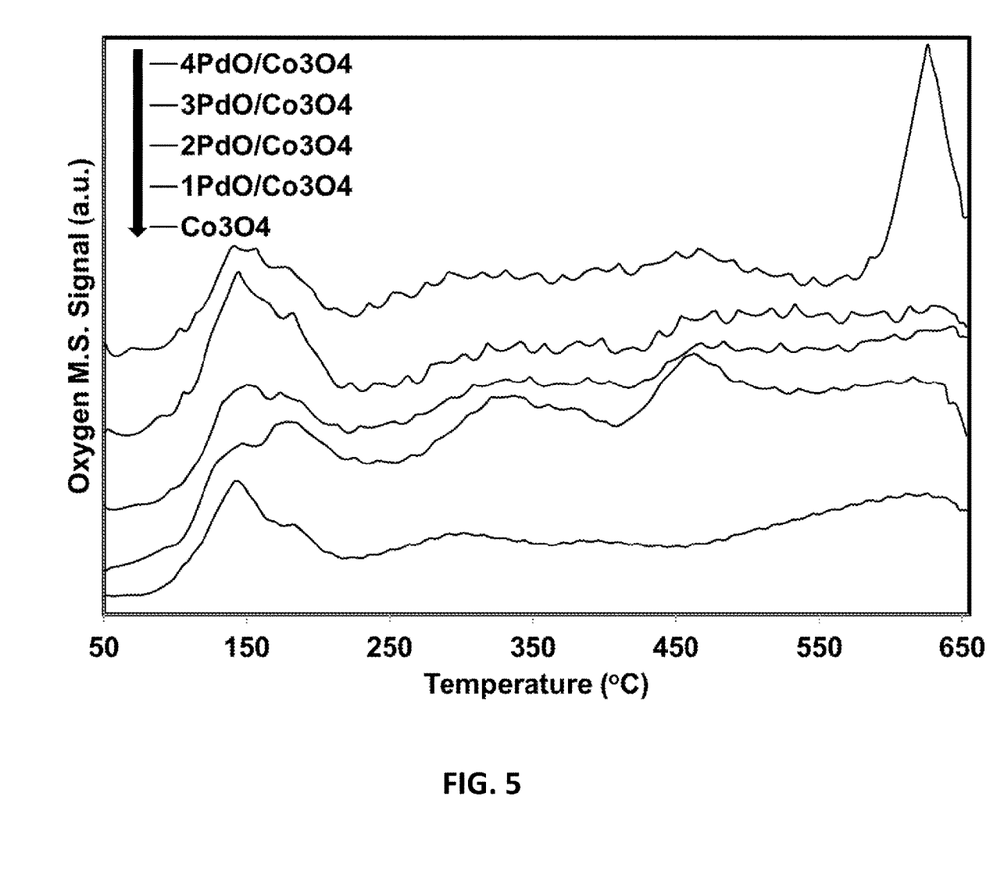
FIG. 5 provides $O_2$-TPD profiles of the $Co_3O_4$ and $PdO/Co_3O_4$ catalysts.

The oxygen release characteristics of the $Co_3O_4$ and $PdO/Co_3O_4$ catalysts can be studied using $O_2$-TPD measurements. FIG. 5 provides $O_2$-TPD profiles of the $Co_3O_4$ and $PdO/Co_3O_4$ catalysts according to the present technology. The $O_2$-TPD profiles are presented as temperature as a function of the amount of oxygen released. For the pure $Co_3O_4$ spinel, physisorbed oxygen releases below 200° C., chemisorbed oxygen releases between 200° C.-450° C., and the bulk oxygen releases after 450° C. The 1 wt % $PdO/Co_3O_4$ catalyst system exhibited a similar $O_2$-TPD profile to the $Co_3O_4$ spinel, but with a higher intensity chemisorbed $O_2$ peak. The 2 wt % $PdO/Co_3O_4$ and the 3 wt % $PdO/Co_3O_4$ catalyst systems also exhibit similar $O_2$-TPD profiles to the $Co_3O_4$. On other hand, however, the 4 wt % $PdO/Co_3O_4$ catalyst system released a relatively larger amount of oxygen in the 570° C.-650° C. temperature region. This oxygen release is from the presence of the additional bulk PdO, evidenced by the XRD above, which is not in contact with the $Co_3O_4$.

Figure 6:
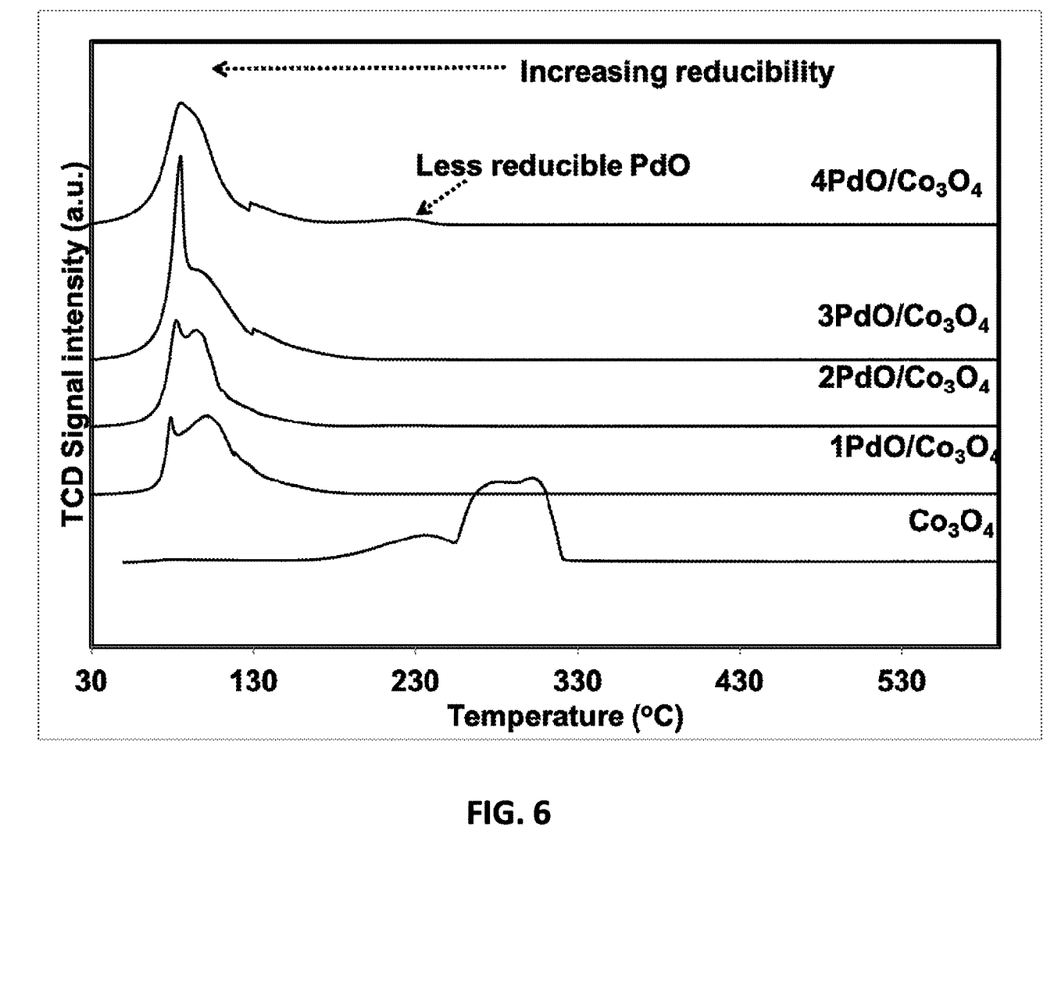
FIG. 6 provides $H_2$-TPR profiles of the $Co_3O_4$ and $PdO/Co_3O_4$ catalysts.

The redox properties of the catalysts can also be evaluated using $H_2$-temperature programmed reduction (TPR) measurements. FIG. 6 provides $H_2$-TPR profiles of the $Co_3O_4$ and $PdO/Co_3O_4$ catalysts. $Co_3O_4$ exhibits three peaks in the TPR profile. The peak at about 230° C. is due to the reduction of lattice oxygen. The peak at about 280° C. is due to the reduction of $Co^{3+}$ to $Co^{2+}$. Lastly, the peak at about 300° C. is the reduction of $Co^{2+}$ to metallic Co. As shown, the addition of PdO to the $Co_3O_4$ spinel has a drastic influence on the redox properties of the $Co_3O_4$ spinel. The 1 wt %-3 wt % $PdO/Co_3O_4$ spinel catalyst systems of the present technology exhibit only two peaks in the $H_2$-TPR profiles. The first peak at about 80° C. is due to the reduction of PdO to the metallic Pd. The second peak observed at about 95° C. is due to the reduction of the $Co_3O_4$ spinel. The addition of PdO to the $Co_3O_4$ promotes the $Co_3O_4$ reduction from about 230° C. to about 95° C. Also, the lattice oxygen reduction, $Co^{3+}$ to $Co^{2+}$ and $Co^{2+}$ metallic Co reduction occurs simultaneously for all the $PdO/Co_3O_4$ catalysts. In addition to these two peaks, the 4 wt % $PdO/Co_3O_4$ also exhibits an additional peak at about 220° C. This peak is due to the reduction of separate bulk PdO that is not in contact with the $Co_3O_4$ spinel. These results show that the addition of PdO to the $Co_3O_4$ spinel promotes the reduction of the $Co_3O_4$ spinel to a lower temperature, and is responsible for the higher direct NOx decomposition activity. However, after 3 wt %, the PdO forms a separate bulk PdO phase and decreases the direct NOx decomposition activity of PdO.

Figure 7:
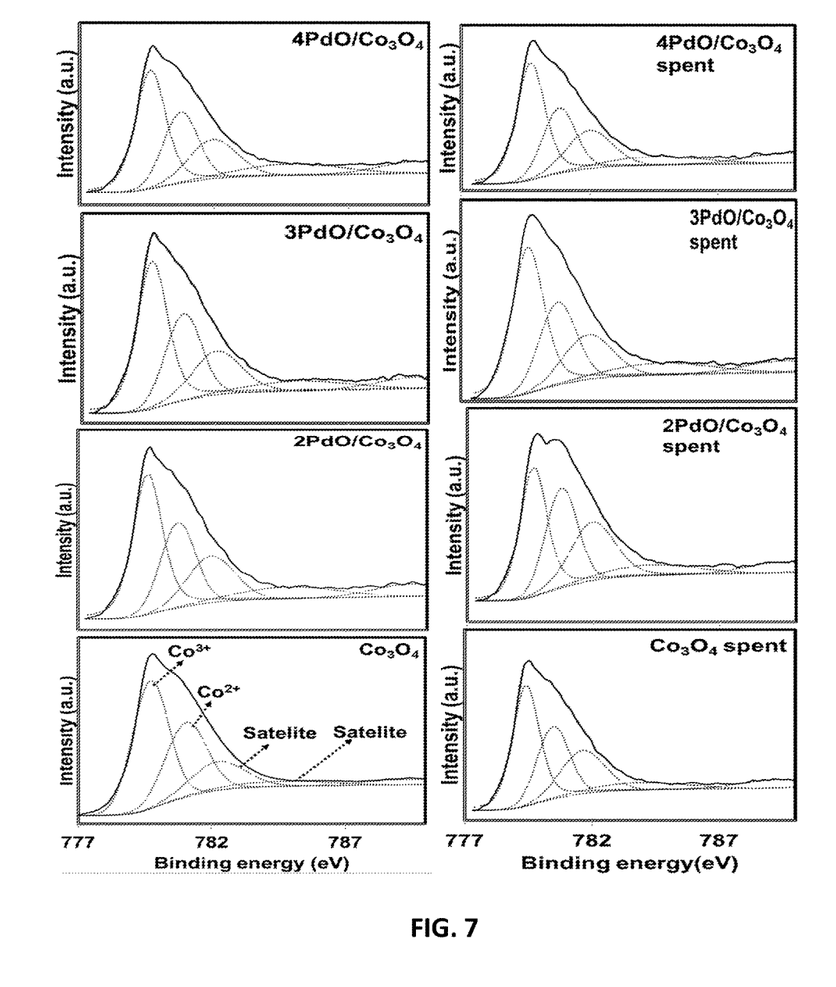
FIG. 7 illustrates Co 2p XPS profiles of the $Co_3O_4$ and the 2 wt %, 3 wt %, and 4 wt % $PdO/Co_3O_4$ catalysts before (left) and after (right) the direct NOx decomposition.

X-ray photoelectron spectroscopy (XPS) measurements can be performed before and after direct NOx decomposition to determine the oxidation state of palladium, and to investigate the effect of PdO on the surface of the $Co_3O_4$ spinel. FIG. 7 illustrates Co 2p XPS profiles of the $Co_3O_4$ and the 2 wt %, 3 wt %, and 4 wt % $PdO/Co_3O_4$ catalysts before (left) and after (right) the direct NOx decomposition. The $Co_3O_4$ spinel exhibits peaks due to the $Co^{3+}$ and $Co^{2+}$ ions along with the satellite peaks. There is little change in the Co 2p spectra after impregnation of PdO onto the $Co_3O_4$ spinel. Also, the PdO loading does not have much influence on the Co 2p spectra. All of the $PdO/Co_3O_4$ samples exhibit peaks due to the $Co^{3+}$ and $Co^{2+}$ ions along with the satellites. The spent catalysts after direct NOx decomposition also exhibit peaks due to the $Co^{3+}$ and $Co^{2+}$ ions. The $PdO/Co_3O_4$ catalysts also exhibit peaks due to $Co^{3+}$ and $Co^{2+}$ ions after direct NOx decomposition irrespective of PdO loading. These results show that PdO has little influence on the Co oxidation state of the $Co_3O_4$ during calcination and during direct NOx decomposition.

Figure 8:
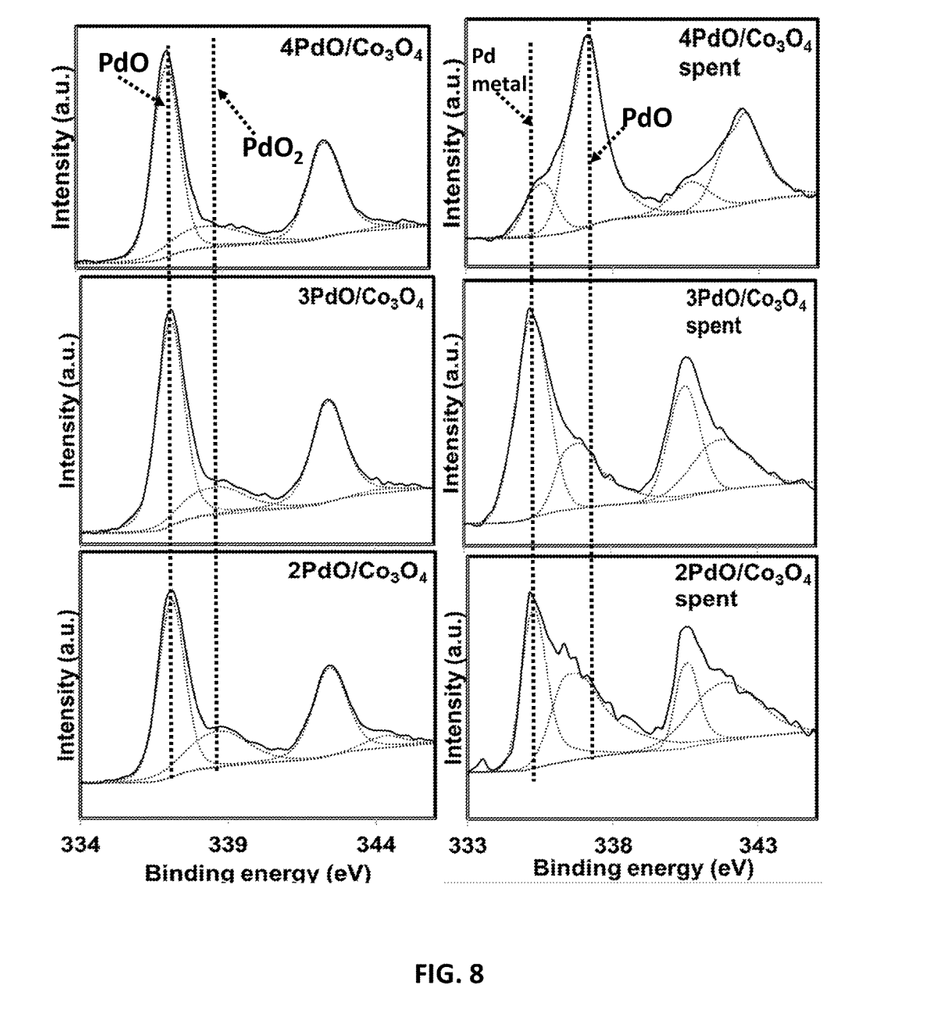
FIG. 8 illustrates Pd 3p XPS profiles of the 2 wt %, 3 wt %, and 4 wt % $PdO/Co_3O_4$ catalysts before (left) and after (right) the direct NOx decomposition.

FIG. 8 illustrates Pd 3p XPS profiles of the 2 wt %, 3 wt %, and 4 wt % $PdO/Co_3O_4$ catalysts before (left) and after (right) the direct NOx decomposition. All of the PdO catalysts exhibit peaks due to the PdO and $PdO_2$ after the calcination irrespective PdO loading. Interestingly, $PdO/Co_3O_4$ catalysts exhibits peaks due to PdO and metallic Pd after direct NOx decomposition. These results suggest that some of the PdO reduced to metallic Pd during direct NOx decomposition and promoted the activity of $Co_3O_4$ spinel catalysts. The intensity of the metallic Pd increases with increasing PdO loading from 2 wt % to the 3 wt %; however, the intensity of the metallic Pd peak decreases drastically with further increasing in the PdO loading from 3 wt % to 4 wt %. This is due to the formation of the separate bulk PdO phase in the 4 wt % $PdO/Co_3O_4$ samples. The formation of separate PdO phase leads to less reduction of PdO to metallic Pd during direct NOx decomposition and is the cause of the lower activity compared to the 3 wt % $PdO/Co_3O_4$ catalyst.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A catalyst system for the direct decomposition removal of $NO_x$ from an exhaust gas stream provided at a temperature of from about 400° C. to about 650° C., the catalyst system comprising:
   a $Co_3O_4$ spinel oxide; and
   PdO dispersed on a surface of the $Co_3O_4$ spinel oxide and configured to catalyze a decomposition of the $NO_x$ to generate $N_2$ without the presence of a reductant, wherein the PdO is provided in an amount of from about 1 wt % to about 3 wt % of the catalyst system.

2. The catalyst system according to claim 1, wherein the PdO is provided in an amount of from about 2 wt % to about 3 wt % of the catalyst system.

3. The catalyst system according to claim 2, wherein the PdO is dispersed on the $Co_3O_4$ spinel oxide via wet impregnation techniques providing the PdO in an amount of about 3 wt % of the catalyst system, further providing an $NO_x$ selectivity to $N_2$ greater than about 50% when the exhaust was stream is provided at a temperature of from about 400° C. to about 450° C.

4. The catalyst system according to claim 1, providing an $NO_x$ selectivity to $N_2$ greater than about 75% when the exhaust gas stream is provided at a temperature at or greater than about 450° C.

5. A catalytic converter for the direct decomposition removal of NOx from an exhaust gas stream flowing at a temperature of from about 400° C. to about 650° C., the catalytic converter comprising:
   an inlet configured to receive the exhaust gas stream into an enclosure;
   an outlet configured to allow the exhaust gas stream to exit the enclosure; and
   a catalyst system contained inside the enclosure, the catalyst system comprising PdO dispersed on a surface of a C03O4 spinel oxide, configured to catalyze a decomposition of the NOx to generate N2 without the presence of a reductant.

6. The catalytic converter according to claim 5, wherein the $Co_3O_4$ spinel oxide is in a nanoparticle form, having an average diameter of from about 2 to about 100 nm.

7. The catalytic converter according to claim 5, wherein the PdO is dispersed on a surface of the metal $Co_3O_4$ spinel oxide and provided in an amount of from about 1 wt % to about 3 wt % of the catalyst system.

8. The catalytic converter according to claim 7, wherein the PdO is dispersed on a surface of the $Co_3O_4$ spinel oxide and provided in an amount of from about 2 wt % to about 3 wt % of the catalyst system.

9. The catalytic converter according to claim 5, configured to flow the exhaust gas stream through the catalyst system at a temperature of from about 400° C. to about 450° C. and obtaining an NOx selectivity to $N_2$ greater than about 50%.

10. The catalytic converter according to claim 9, configured to flow the exhaust gas stream through the catalyst system at a temperature at or greater than about 450° C. and obtaining an NOx selectivity to $N_2$ greater than about 75%.

11. A method for direct decomposition removal of NOx from an exhaust gas stream, the method comprising:
    flowing the exhaust gas stream through a catalyst system and exposing the exhaust gas stream to palladium oxide (PdO) dispersed on a surface of a $Co_3O_4$ spinel oxide support; and
    catalyzing a decomposition of the NOx to generate $N_2$ without the presence of a reductant.

12. The method according to claim 11, wherein the PdO is provided in an amount of from about 1 wt % to about 3 wt % of the catalyst system.

13. The method according to claim 12, wherein the PdO is provided in an amount of from about 2 wt % to about 3 wt % of the catalyst system.

14. The method according to claim 11, wherein the PdO is provided in an amount of about 3 wt % of the catalyst system and at least a portion of the PdO reduces to metallic Pd during the direct decomposition removal of NOx, and promotes direct NOx activity.

15. The method according to claim 11, comprising flowing the exhaust gas stream through the catalyst system at a temperature of from about 400° C. to about 650° C.

16. The method according to claim 15, comprising flowing the exhaust gas stream through the catalyst system at a temperature of from about 400° C. to about 450° C. and obtaining an NOx selectivity to $N_2$ greater than about 50%.

17. The method according to claim 16, comprising flowing the exhaust gas stream through the catalyst system at a temperature at or greater than about 450° C. and obtaining an NOx selectivity to $N_2$ greater than about 75%.

* * * * *

UNITED STATES PATENT AND TRADEMARK OFFICE
CERTIFICATE OF CORRECTION

PATENT NO. : 10,143,965 B1
APPLICATION NO. : 15/590588
DATED : December 4, 2018
INVENTOR(S) : Krishna Gunugunuri et al.

Page 1 of 1

It is certified that error appears in the above-identified patent and that said Letters Patent is hereby corrected as shown below:

In the Specification

Column 1, Line 46: delete "(Ser. No. 01/060,211) 1"

In the Claims

Claim 3, Column 9, Line 4: delete "was stream" and insert --gas stream--
Claim 5, Column 9, Line 20: delete "a C03O4 spinel" and insert --a $Co_3O_4$ spinel--
Claim 7, Column 9, Line 27: delete "the metal $Co_3O_4$ spinel" and insert --the $Co_3O_4$ spinel--

Signed and Sealed this
Seventh Day of May, 2019

Andrei Iancu
*Director of the United States Patent and Trademark Office*